C. BUEHLER.
LAWN SPRINKLER AND HOSE REEL.
APPLICATION FILED AUG. 20, 1908.

917,999.

Patented Apr. 13, 1909.

Witnesses

Inventor
Christian Buehler
By Foster, Freeman, Watson & Coit
Attorneys

UNITED STATES PATENT OFFICE.

CHRISTIAN BUEHLER, OF ST. MARYS, OHIO, ASSIGNOR TO WILLIAM JASPERSEN, OF ST. MARYS, OHIO.

LAWN-SPRINKLER AND HOSE-REEL.

No. 917,999.　　　Specification of Letters Patent.　　Patented April 13, 1909.

Application filed August 20, 1908. Serial No. 449,437.

*To all whom it may concern:*

Be it known that I, CHRISTIAN BUEHLER, a citizen of the United States, and resident of St. Marys, Ohio, have invented a certain new and useful Improvement in Lawn-Sprinklers and Hose-Reels, of which the following is a specification.

This invention relates to a combined lawn sprinkler and hose reel. It embodies a movable fountain mounted upon a hose truck so as to be easily moved and includes a hose reel to carry the hose when not in use. Its objects are to produce a device which will be simple in construction and efficient in operation, and its novel features will be understood from the following description taken in connection with the drawings.

Figure 1:
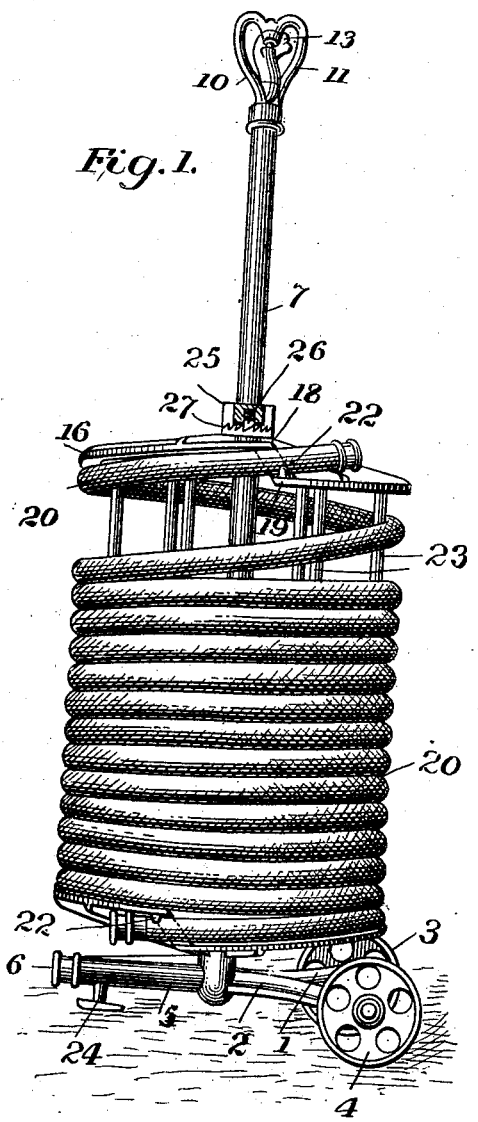
Figure 2:
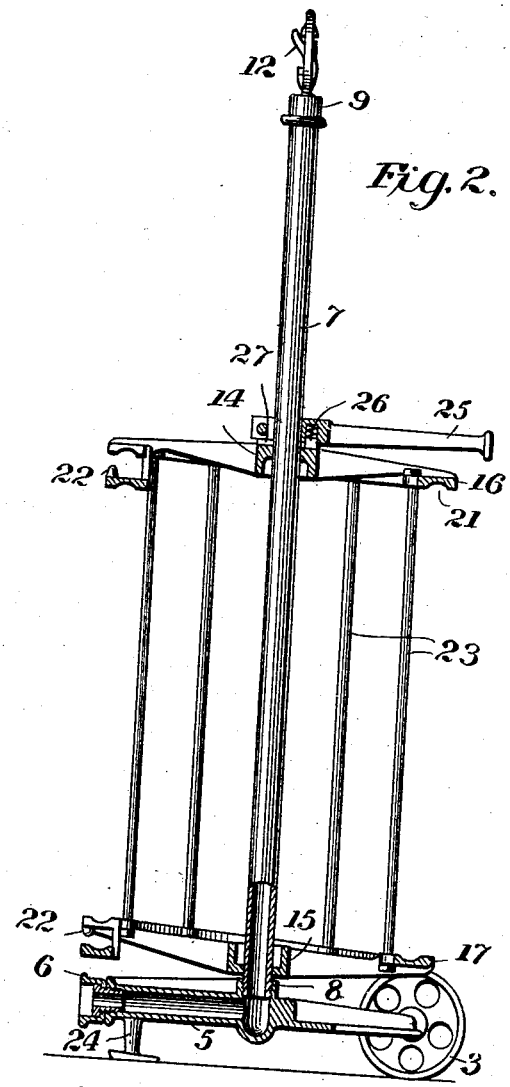
Figure 3:
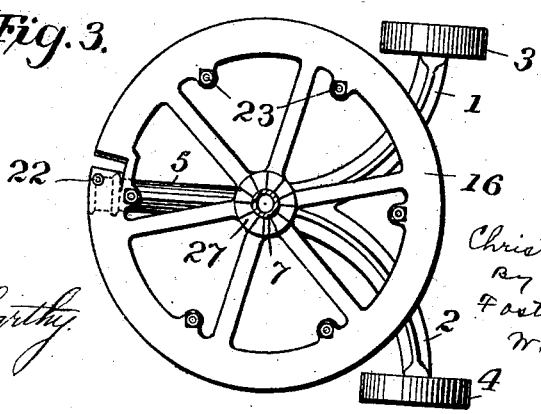

In the drawings, Figure 1 is a view of the device showing the hose in place on the reel; Fig. 2 is a partial vertical section through the device; and Fig. 3 is a plan view.

My improved device embodies a main frame including the forked arms 1 and 2 carrying upon their ends the wheels 3 and 4 and the hollow section 5 formed integral with the arms 1 and 2, and having at its outer end means 6 for connection with the supply pipe. An upright pipe 7 is secured in the thimble 8 on the main frame and communicates with the interior of the hollow section 5. This pipe has secured to its outer end a thimble 9 having the arms 10 and 11 forming a heart-shaped handle. A rotary spraying device 12 is mounted within this handle upon the pin 13 and this device communicates with the interior of the pipe 7 whereby it will spray the water supplied through that pipe in all directions.

Two separated spider frames 14 and 15 are rotatively mounted upon the pipe 7 and these frames carry at their outer edges similar spiral-shaped rings 16 and 17. The ends 18 and 19 of the ring 16 are separated sufficiently to receive the end of the hose 20 and the under surface of the ring 16 is provided with a groove 21 in which the hose is adapted to fit. The end 19 of the ring is provided with a lug 22 for the purpose of holding the end of the hose in place. Vertical rods 23 parallel to the pipe 7 connect the rings 16 and 17 and with the end frames form the hose reel rotatively mounted upon the pipe 7.

An arm 24 projects downwardly from the end of the main frame and together with the wheels 3 and 4 support that frame in a horizontal position with the pipe 7 extending vertically, thus producing a fountain for spraying the lawns. An arm 25 is secured by any suitable means to the pipe 7 above the frame 14 and in close proximity thereto and this arm extends beyond the edge of the hose reel and to a point substantially in line with the forward edge of the wheels 3 and 4 so that when the device is turned upon its side this arm 25 together with the wheels will support the pipe 7 and the hose reel in a substantially horizontal position. Within the arm 25 near the pipe 7 there is mounted a spring-pressed pawl 26 which is adapted to engage teeth 27 in the top of the frame 14, thus preventing a reverse rotation of the hose reel.

It will be understood that the device may be grasped by the handle 11 and by tilting it slightly may be rolled to the position desired and it may be there set up as a fountain with the pipe 7 extending vertically. The hose carried on the reel as shown in Fig. 1 may then be unwound and connected to the hollow section 5 by the connecting means 6 so as to supply water to the device. When the use of the device is finished the hose is disconnected; the device is turned upon its side resting upon the arm 25; the end of the hose is secured between the ends 18 and 19 of the lower spiral ring; the reel is rotated until the entire hose is wound thereon, and the other end of the hose is then secured between the ends 18 and 19 of the upper spiral ring.

It will be observed that when the hose is in place on the reel and the apparatus in the upright position the hose has a gradual inclination from one end to the other whereby any water in it will be drained.

Having thus described my invention, what I claim is:

1. In a device of the class described, the combination with a frame mounted on wheels, of an upright water discharge pipe secured to said frame, a hose reel surrounding said upright pipe and mounted to rotate thereon, an arm secured to said pipe and adapted to coöperate with said wheels to support said pipe and reel in a horizontal position, and pawl and ratchet connection between said arm and reel for controlling the direction of rotation of said reel.

2. In a device of the class described the combination with a frame mounted on wheels, of an upright water discharge pipe secured to said frame, a hose reel surrounding said upright pipe embodying spiral-shaped end frames, and connecting rods and bearings whereby said reel may rotate on said pipe.

3. In a device of the class described the combination with a frame provided with a hollow section adapted for connection with a supply pipe, of an arm for supporting one end of said frame, wheels for supporting the other end of said frame, an upright pipe secured to said frame and communicating with said hollow section, a hose reel surrounding said pipe and mounted to rotate thereon, an arm secured to said pipe at the upper end of said reel carrying a spring actuated pawl, and ratchet teeth on the upper end of said reel coöperating with said pawl.

4. In a device of the class described the combination with a frame mounted on wheels, of an upright water discharge pipe secured to said frame, separated spider frames rotatively mounted on said pipe, spiral ring-like end pieces secured to said spider frames and providing means between adjacent ends of the spiral for receiving and holding the ends of a flexible pipe, and rods connecting the said spiral end pieces and forming a hose reel.

5. In a device of the class described the combination with a frame mounted on wheels, of an upright water discharge pipe secured to said frame, separated spider frames rotatively mounted on said pipe, spiral ring-like end pieces secured to said spider frames and providing means between adjacent ends of the spiral for receiving and holding the ends of a flexible pipe, and rods connecting the said spiral end pieces and forming a hose reel, the construction of the reel and holding means being such that the hose when wound upon the reel will have a gradual inclination from one end to the other thereby draining all water from it.

In testimony whereof I affix my signature in presence of two witnesses.

CHRISTIAN BUEHLER.

Witnesses:
  LEWIS F. STOUT,
  WM. JASPERSEN.